United States Patent [19]

Scotto

[11] Patent Number: 4,517,749
[45] Date of Patent: May 21, 1985

[54] STABLE PLUMB BEAM OPTICAL PROJECTOR

[75] Inventor: Dominick P. Scotto, Plainview, N.Y.

[73] Assignee: Sperry Corporation, New York, N.Y.

[21] Appl. No.: 523,314

[22] Filed: Aug. 15, 1983

[51] Int. Cl.³ ............................................. G01C 9/15
[52] U.S. Cl. .............................. 33/346; 33/275 R; 33/391; 33/402; 33/397; 33/286
[58] Field of Search ............... 33/227, 397, 286, 283, 33/275 R, 391, 395, 402, 344, 346, 365, 311, 313, 401, 396

[56] References Cited

U.S. PATENT DOCUMENTS

| | | | |
|---|---|---|---|
| 369,750 | 9/1887 | Spranger | 33/344 |
| 585,850 | 7/1897 | Patrick | 33/402 |
| 2,503,422 | 4/1950 | Silverman et al. | 33/402 X |
| 2,517,295 | 8/1950 | Esher | 33/275 R |
| 2,843,001 | 7/1958 | Werner | 33/402 X |
| 3,014,283 | 12/1961 | Hofmann | 33/402 |
| 3,505,739 | 4/1970 | Abrams | 33/227 |
| 3,555,691 | 1/1971 | Jacoby | 33/312 |
| 3,911,588 | 10/1975 | Ohneda | 33/227 |
| 3,983,636 | 10/1976 | Fashbaugh et al. | 33/346 |
| 4,206,550 | 6/1980 | Boyett et al. | 33/286 |

*Primary Examiner*—William D. Martin, Jr.
*Attorney, Agent, or Firm*—Howard P. Terry; Seymour Levine

[57] ABSTRACT

A viscous dampened sensitive pendulum carries a generally upwardly directed light source for indicating the gravity vertical. The sensitive pendulum is carried for two degrees of pivotal freedom by flexural pivots which are biased for operation at an error free or hysteresis free zero spring rate for small pivotal deflections. A drive pendulum coupled through the flexural pivots to the sensitive pendulum maintains a small pivotal deflection so that error free, zero spring rate, operation is achieved.

13 Claims, 6 Drawing Figures

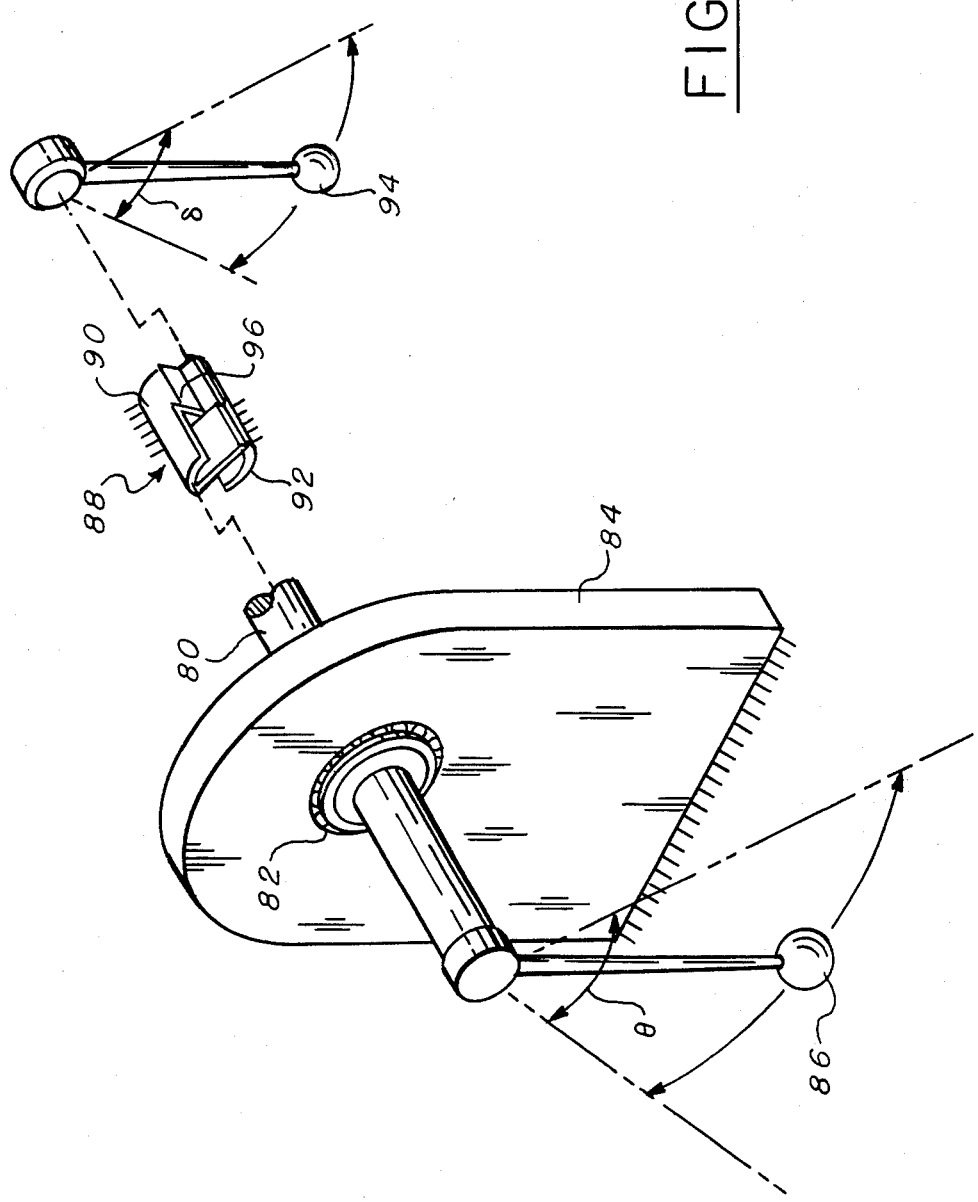

STABLE PLUMB BEAM OPTICAL PROJECTOR

BACKGROUND OF THE INVENTION

1. Field of the Invention

This invention relates to instruments for locating the gravity vertical, and more specifically, to an instrument for projecting a dual pendulum stabilized light beam along a vertical line.

2. Description of the Prior Art

In construction the traditional tool for aligning a vertical structural member is the plumb bob. While inexpensive and simple to use, the plumb bob is limited by its sensitivity to structural vibration and air currents. At the other end of the economic spectrum is the jig transit, a very expensive instrument of great accuracy. Aside from its expense, the jib transit is delicate and more time consuming to operate, thus not well adapted for use by construction workers who must erect and align many vertical structural members in the course of a day.

It is generally known that a light beam or laser beam may be aligned with the gravity vertical to illuminate a reference point on an external surface vertically and spatially displaced from the light source. Typically, optical plumbing devices of this nature employ a light source mounted on a platform which may be aligned with the gravity vertical by means of one or more spirit levels and adjustable leveling legs. On a construction site this optical plumbing device has one great disadvantage. Rarely is the surface on which the device is placed found to be uniformly smooth and perfectly level. Thus the construction worker, moving the plumbing device from location to location, must constantly readjust the leveling legs to assure verticality. Furthermore, spirit levels are prone to parallax errors, and even minute parallax errors cause considerable deviations from the vertical when the beam is projected a great distance.

The present invention fills the economic and functional gap between the plumb bob and the jig transit by providing an extremely rugged and easy to use instrument for projecting a light beam along a vertical line. The invention has the further advantage of being extremely accurate regardless of the construction site terrain and requires no onsight adjustment by the construction worker.

SUMMARY OF THE INVENTION

In accordance with this invention a drive pendulum is journalled for rotational movement in response to gravitational forces acting thereon. A second sensitive pendulum is coupled for rotational movement to the drive pendulum by means of a flexural pivot which is loaded or biased for operation at the zero spring rate by properly selecting the mass of the sensitive pendulum. The sensitive pendulum comprises or carries a light source such as a helium neon laser which upwardly projects a vertical light beam. A reticle placed on the member to be vertically aligned intercepts the upwardly projected light beam thus permitting the construction worker to adjust the member accordingly.

BRIEF DESCRIPTION OF THE DRAWINGS

FIG. 4 is a simplified diagrammatical view of the dual pendulum system useful for explaining the operation of the invention.

DESCRIPTION OF THE PREFERRED EMBODIMENT

Figure 1:
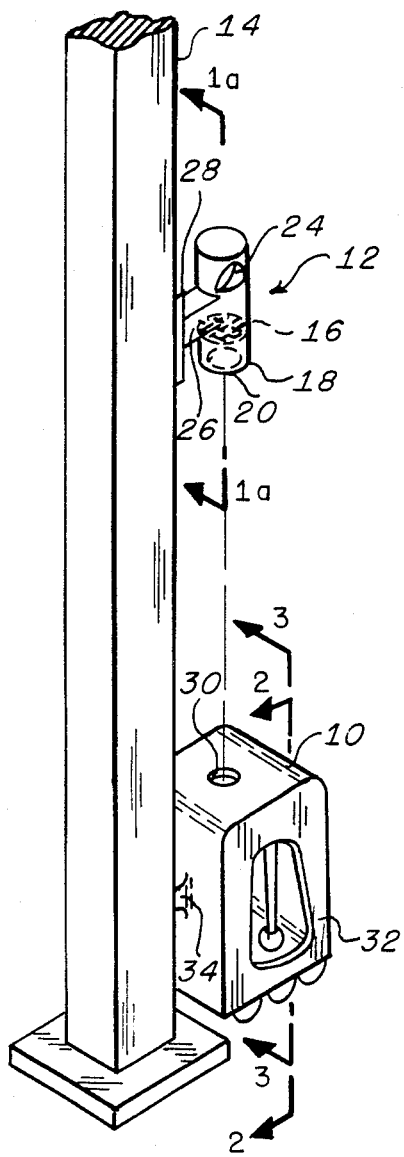
FIG. 1 is a perspective view of the plumb beam projector illustrating the apparatus in use.
Figure 1A:
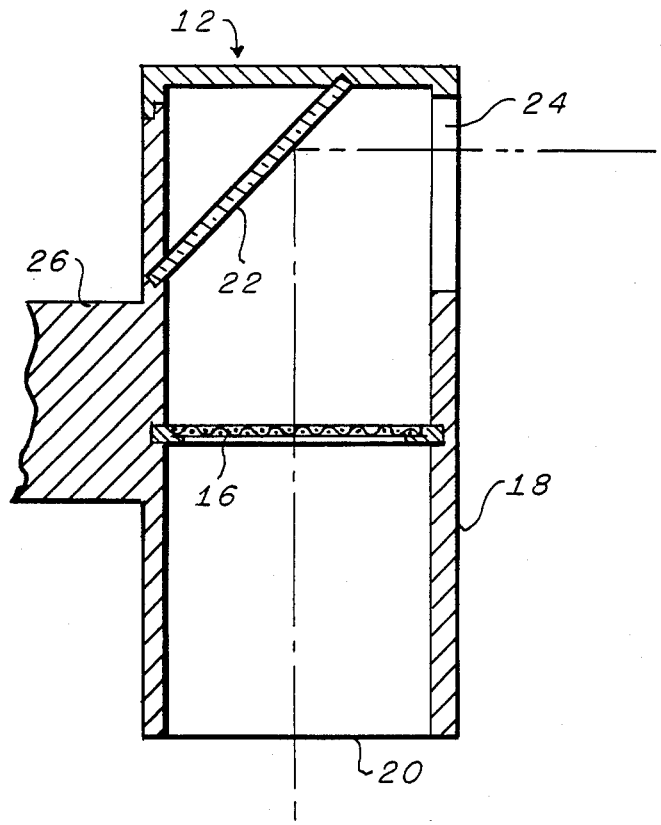
FIG. 1A is a cross sectional view taken along the line A—A in FIG. 1.

Referring to FIG. 1 of the drawings, the present invention comprising a plumb beam projector 10 and target scope 12 are shown in conjunction with a standard or stanchion 14 to be aligned with respect to the gravity vertical. FIG. 1A shows the target scope in cross section taken along the line A—A of FIG. 1. The target scope includes a reticle 16 which may be, for example, a frosted glass slide with crosshairs or a grid scribed thereon. The reticle is carried by a housing or shroud 18 which may be of a generally cylindrical shape having an opening or aperture 20 in one end thereof. A diagonally arranged mirror 22 is attached within the shroud so that light entering aperture 20 is reflected perpendicularly. A second aperture 24 is formed in the sidewall of shroud 18 to permit light reflected from mirror 22 to pass therethrough. The entire target scope 12 is temporarily mounted to the standard 14 by means of a bracket 26. This temporary attachment may be by any convenient means such as with magnets or clamps 28. The plumb beam projector 10 includes an aperture 30 through which a collimated light beam may be projected. The case or housing 32 of the plumb beam projector includes a projecting member 34 which, when placed in contact with standard 14, spaces the beam aperture 30 a distance D from the surface of the standard. The target scope bracket 26 is of a similar length so that when attached to the standard the crosshairs or grid of reticle 16 are precisely the distance D from the standard. In addition, both the target scope bracket 26 and the projecting member 34 include pointers 36 so that they may both be aligned along the length of the standard, such as along a line which bisects the standard's width.

Figure 2:
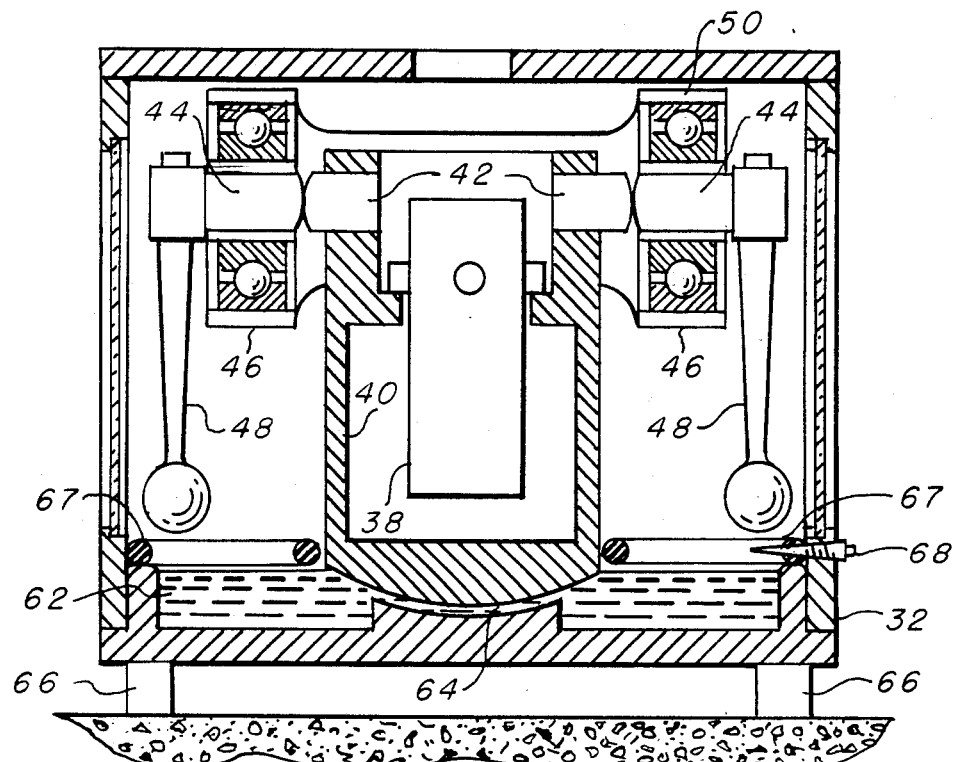
FIG. 2 is a medial vertical sectional view taken along the line 2—2 of FIG. 1.
Figure 3:
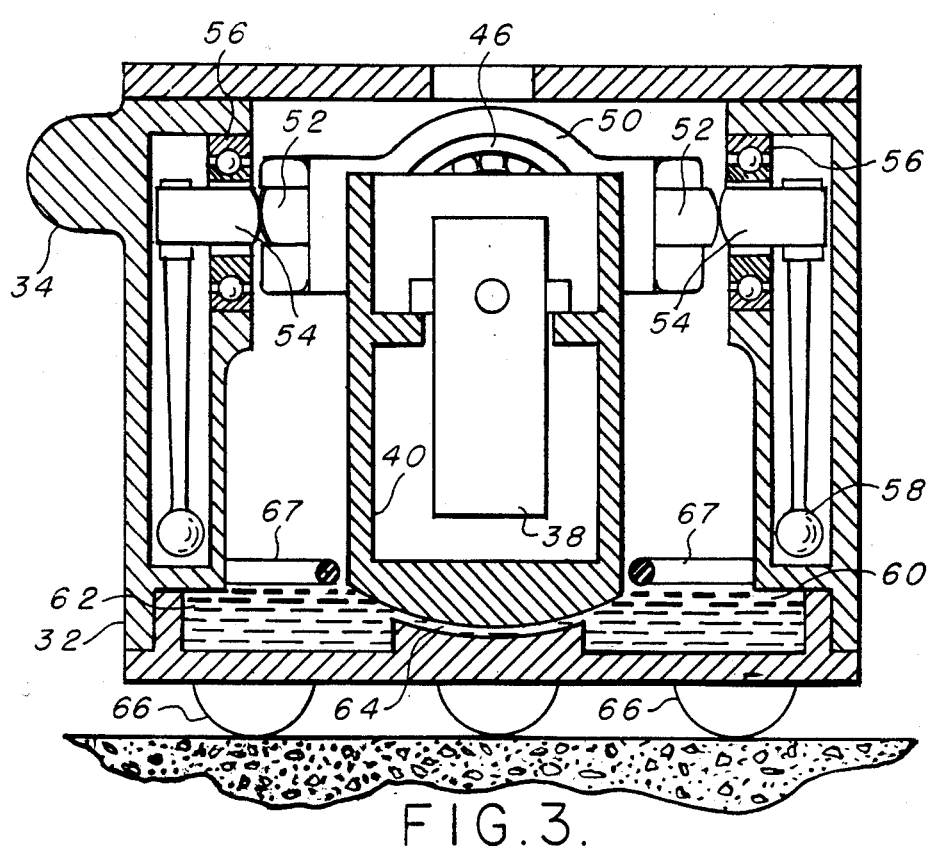
FIG. 3 is a similar medial sectional view taken along the line 3—3 of FIG. 1.

With reference to FIGS. 2 and 3, the plumb beam projector comprises a source of collimated light such as a laser 38 which is carried by a sensitive pendulum 40. In the presently preferred embodiment this sensitive pendulum takes the form of a bucket enclosing the laser. However, when considering the mass of the pendulum it will be appreciated that the laser may be considered as part of the pendulum. The sensitive pendulum is carried for rotational movement in a first plane by a pair of flexural pivots 42. This first plane of rotation would appear in FIG. 2 on edge as a line passing axially through the laser 38, in other words, rotation is about the axis of the flexural pivots 42. These flexural pivots may be of the crossed flexural spring type. These flexural pivots are known to have a certain torsional resistance to rotational movement known as the torsional spring rate, often given in units of foot pounds per degree of deflection. It is known that the spring rate of these flexural pivots is a function of the radial load or tension applied. For very small angular deflections there is a particular load unique to each class of flexural pivots which produces a zero spring rate. Operating at this zero spring rate point the flexural pivot has virtually no hysteresis, and no tendency to return to any particular position. In other words, assuming very small angular deflections, a pendulum supported by flexural pivots will have no tendency to stick off plumb. The flexural pivots 42 have outwardly extending shafts 44 which are journalled for axial rotation in a pair of conventional bearings 46. Rigidly secured at the end of the shaft 44 are drive pendulums 48. The drive pendulums 48 acting through shaft 44 thus couple rotational movement through the flexural pivots 42 to the sensitive pendulum 40. A simplified depiction of the coupling between drive pendulum and sensitive pendulum is seen in FIG. 4. The bearings 46 are carried by a gimbal 50 which is supported by a second pair of flexural pivots 52, shown in FIG. 3, which are oriented at right angles to the first pair of flexural pivots. The second pair of flexural pivots includes shafts 54 which are journalled in bearings 56 for rotation about the axis of the shaft. Secured at the ends of the shafts 54 are drive pendulums 58.

The bearings 56 are carried by the housing 32. Thus it will be seen that the sensitive pendulum 42 including the collimated light source 38 may rotate with 2 degrees of freedom in respect to the housing. The housing may include a fluid reservoir 60 for containing a viscous fluid 62. A restricted fluid passageway 64 communicates with the fluid reservoir 60 and provides viscous dampening of the sensitive pendulum by conducting viscous fluid into contact with the sensitive pendulum thereby frictionally retarding its movement. It will be understood that the viscous dampening system thus described is but one way of performing this function. Viscous dampening might alternatively be supplied by providing shafts 44 and 54 with a relatively restricted annular fluid passage or space between the shaft and the respective bearings. Thus viscous frictional losses could be introduced at the shaft-bearing interface. As will be appreciated by those skilled in the art, the flexural pivots may be electrically insulated from one another to facilitate the supplying of electric current to the collimated light source through those flexure pivots. In the presently preferred embodiment the housing 32 rests on three rubber feet 66 which assure the projector a stable base even on rugged terrain and also electrically isolates the device from the ground. To facilitate transporting the device a retractable pendulum stop 67 is included. The pendulum stop comprises a torus shaped inner tube which encircles the sensitive pendulum 40. A valve 68 such as a needle valve is included for inflating and deflating the inner tube, so as to grasp or release the sensitive pendulum. It will be seen that this inner tube construction serves not only to isolate the sensitive pendulum from shock during transportation but also holds the sensitive pendulum in a relatively centered position, thus minimizing the settling time of the sensitive pendulum.

While the present description has dealt with a device for projecting a vertical beam, it will be understood that a simple modification will transform the device into a stable horizontally projecting instrument. By mounting a pentaprism or pentamirror above the aperture 30, the beam of collimated light can be deflected 90 degrees. Then by rotating the pentaprism, either manually or by motor, a perfectly level horizontal line can be drawn or swept across a vertical surface. Sweeping back and forth at a sufficient speed to take advantage of the persistence of vision, a horizontal line will be perceived.

Figure 5:
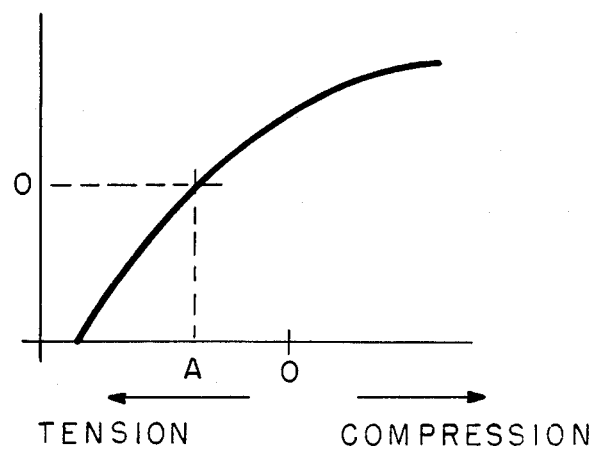
FIG. 5 is a graph of torsional spring rate vs radial load for a typical flexural pivot.

While the presently preferred plumb beam projector utilizes a pair of drive pendulums mutually coupled through a pair of flexural pivots to a centrally located sensitive pendulum for each degree of freedom, other arrangements are possible. For instance, FIG. 4 shows another more simplified configuration which utilizes the principles of the invention. In FIG. 4 a shaft 80 is journalled in a conventional bearing 82 carried on a support 84 which is secured to the projector's case shown diagrammatically or to a gimbal rotatable about an orthogonal axis. A drive pendulum 86 is coupled to one end of the shaft 80 for swinging movement about the shaft's axis. At the other end of the shaft is a flexural pivot 88. There are many flexural pivots which may be utilized in this application, as will be appreciated by those familiar with these devices. The flexural pivot shown in FIG. 4 comprises a first coupling 90 attached to the shaft 80, as shown diagrammatically, and a second coupling 92 for attachment to a sensitive pendulum 94, shown diagrammatically. The first and second couplings are joined by a pair of crossed flexural springs 96 which provide flexing action about the axis of rotation of shaft 80. The graph of FIG. 5 shows the relationship between radial load and torsional spring rate for a typical flexural pivot. Note that for a particular value of radial load, in this case a tension of A pounds, a zero torsional spring rate results. It will be seen that by suspending the flexural pivot 88 from shaft 80 and selecting the mass of pendulum 94 to have a weight of A pounds, the proper torsional force is applied such that the flexural pivot operates at its zero spring rate point. In other words, at this point, for very small deflection δ of the sensitive pendulum, the flexural pivot will have no tendency to stick at any particular off plumb position.

OPERATION

To demonstrate the principles of the invention through its operation it will be assumed that a vertical standard has been erected and must now be brought into plumb. The worker might begin by locating a reference line along the length of the standard, such as centrally along one face of the standard. The target scope is then attached near the top of the standard with its aperture 20 facing downward and its pointer 36 aligned with the reference line. Next the plumb beam projector 10 is placed at the base of the standard so that its projecting member 34 and pointer touches the standard at a point along the reference line. Next the light source may be energized so that a collimated light beam is projected through the aperture 30 of the plumb beam projector and generally upward toward the target scope 12. Next by opening valve 68 and deflating the torus pendulum stop, the pendulums are then free to align themselves with the force of gravity. Recall that the sensitive pendulum which is suspended by one or more flexural pivots is biased by proper selection of the sensitive pendulum mass to operate at a zero spring rate, provided its deflection is kept at a minimum. The drive pendulum 86 is primarily responsible for making the necessary crude adjustments to the positions of both pendulums so that the sensitive pendulum may, in fact, operate in its zero spring rate region. For example, if the plumb beam projector is placed on a five degree grade, the sensitive pendulum may initially be outside its zero spring rate region. The drive pendulum rotating in a conventional bearing will oscillate back and forth in the viscous dampened environment to eventually settle at a point very near the true vertical. Any deviation of the drive pendulum from the true vertical may be attributable, for example, to hysteresis losses or other imperfections in the conventional bearing system. This deviation is so slight that the sensitive pendulum, following the drive pendulum, finally settles to within its zero spring rate region. Once inside this region the sensitive pendulum, acting under the force of gravity, seeks out the true vertical and directs the laser or collimated light beam accordingly. The worker by viewing the strike of the light beam on the reticle 16 is now able to adjust the verticality of the standard until the light beam strikes at precisely the crosshair point indicating the true vertical position. Presumably the standard will be secured in that position and the target scope and plumb beam projector may now be removed after reinflating the torus pendulum stop 66.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A plumbing device comprising:
   a housing having an aperture through one surface thereof;
   first pendulum means pivotally coupled to said housing for pendulous movement therewithin about a first axis;
   second pendulum means having a preselected mass and positioned within said housing for pendulous movement therewithin about said first axis;
   a first flexural pivot having first means for coupling to said first pendulum means and second means for coupling to said second pedulum means, said first flexural pivot operable at a torsional spring rate determined by said preselected mass; and
   means linearly positioned and coupled to said second pendulum means for indicating deviations of said linear positioning from verticality.

2. A plumbing device according to claim 1 wherein said deviation indicating means comprises:
   light source means coupled to said second pendulum means for providing a light beam that projects through said aperture along a path corresponding to angular orientations of said second pendulum means, said light beam projected along a vertical path when said second pendulum is plumb; and
   target means aligned with said aperture to receive said light beam for indicating deviations of said linear positioning from said angular orientations of said second pendulum.

3. A plumbing device according to claim 1 further comprising means positioned within said housing for damping said second pendulum means.

4. The device according to claim 3 wherein said damping means comprises viscous fluid.

5. A plumbing device according to claim 1 further including means positioned within said housing for stopping pendulous movement of said second pendulum means.

6. A plumbing device according to claim 5 wherein said stopping means comprises pneumatic means selectively inflatable and deflatable for engaging said second pendulum means when inflated to stop pendulous movement thereof and permitting pendulous movement when deflated.

7. The device according to claim 6 wherein said pneumatic means is torus shaped and encircles said second pendulum means.

8. A plumbing device according to claim 1 further comprising:
   third pendulum means pivotally coupled to said housing for pendulous movement about a second axis orthogonal to said first axis;
   a second flexural pivot having first means for coupling to said third pendulum means and second means for coupling to said second pendulum means, permitting pendulous movement of said second pendulum means about said second flexural pivot operable at a torsional spring rate determined by said preselected mass.

9. A plumbing device according to claim 8 further comprising a first shaft coupled to said housing, journalled for rotation about said first axis, and having a first end coupled to said first pendulum means and a second end coupled to said first means of said first flexural pivot.

10. A plumbing device according to claim 9 further comprising a gimbal coupled between said first and second coupling means of said second flexural pivot for rotation about said first axis, and a second shaft coupled to said third pendulum means and journalled in said gimbal for rotation about said second axis.

11. A plumbing device according to claim 10 wherein said first coupling means of said second flexural pivot couples to said second shaft and said second coupling means thereof couples to said second pendulum means.

12. A plumbing device according to claim 11 wherein said preselected mass is chosen such that said first and second flexural pivots operate at a zero torsional spring rate.

13. A plumbing device according to claim 1 wherein said preselected mass is chosen such that said first flexural pivot operates at a zero torsional spring rate.

* * * * *